United States Patent Office 3,324,157
Patented June 6, 1967

3,324,157
METALLOCENYL SUBSTITUTED
ORGANOPOLYSILOXANES
Edward V. Wilkus, Albany, and Abe Berger, Schenectady, N.Y., assignors to General Electric Company, a corporation of New York
No Drawing. Filed May 27, 1963, Ser. No. 283,544
8 Claims. (Cl. 260—439)

The present invention relates to organopolysiloxanes composed of chemically combined organosiloxy units having at least one organometallocene radical attached to silicon by carbon-silicon linkages.

The novel organopolysiloxanes of the present invention are selected from (a) Polymers composed of chemically combined structural units of the formula, (1)
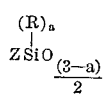

and (b) Copolymers composed of chemically combined structural units of the formula, (2)
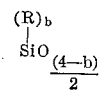

and at least one unit of (a), where R is a member selected from monovalent hydrocarbon radicals, halogenated monovalent hydrocarbon radicals, cyanoalkyl radicals and fluoroalkyl radicals, $a$ is a whole number equal to from 0 to 2, inclusive, $b$ is a whole number equal to from 0 to 3, inclusive, and Z is an organometallocene radical having the formula, (3)        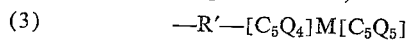

where R' is a member selected from divalent hydrocarbon radicals, and —R"—Y—, R" is a divalent hydrocarbon radical of at least two carbon atoms, Y is a member selected from carbonyl, carbinol, carbamino, and carbazido, M is a transition metal, and Q is chemically bonded to a five-membered carboxylic and a member selected from hydrogen, a monovalent electron donating organic radical, a monovalent electron withdrawing organic radical, and mixtures thereof.

Radicals included by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic such as alkyl, alkenyl, cycloalkyl, haloalkyl including methyl, ethyl, propyl, butyl chlorobutyl, cyclohexyl, etc.; cyanoethyl cyanopropyl, cyanobutyl, etc.; fluoroethyl, fluoropropyl, etc. Radicals included by R' of Formula 3 are arylene radicals, and alkylene radicals such as phenylene, tolylene, methylene, ethylene, trimethylene, tetramethylene, pentamethylene, decamethylene, etc.; radicals included by R" are all of the aforementioned R' radicals that have at least 2 carbon atoms. Monovalent electron donating organic radicals included by Q of Formula 3 are aryl radicals, and hydroxyaryl, for example, phenyl, tolyl, hydroxyphenyl, etc.; aliphatic radicals including alkyl radicals such as methyl, ethyl, propyl, butyl, octyl, etc.; alkenyl radicals such as vinyl, propenyl, etc.; cycloaliphatic such as cyclohexyl, cycloheptyl, etc.; carboxyaliphatic radicals such as carboxymethyl, carboxyethyl, etc.; triorganosilyl radicals such as trimethylsilyl, dimethylphenylsilyl, etc.; nitroaliphatic radicals such as nitromethyl, nitroethyl, etc. Monovalent electron withdrawing organic radicals included by Q of Formula 3 are radicals such as aliphatic acyl, for example, formyl, acetyl, propionyl, arylacyl such as benzoyl, etc.; carboxy; aldehydic, sulfo; carboxy aryl, such as carboxyphenyl, carboxytolyl, etc.; nitroaryl such as nitrophenyl; haloaryl such as chlorophenyl, bromotolyl, etc.; haloaliphatic such as chloromethyl, chloroethyl, etc. Radicals included by R of Formulae 1 and 2 can be all the same radicals or any two or more of the aforementioned R radicals. Similarly, radicals included by Q can be all the same radical or any two or more of the aforementioned Q radicals.

"Transition metal" utilized in the description of the present invention shown by M of Formula 3 includes all metals of Group III to VIII of the Periodic Table capable of forming a π complex with a cyclopentadienyl radical to form a metallocene. The transition metals that are operative in the present invention are for example, metals having atomic numbers 22 to 28, 40 to 46, and 72 to 78, such as titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium and platinum.

Some of the organopolysiloxanes of the present invention can be made by hydrolyzing metallocenyl silanes of the formula, (4)
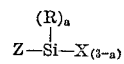

where R, Z and $a$ are as defined above, and X is a halogen radical. Other organopolysiloxanes of the invention having units shown by Formula 2 can be made by cohydrolyzing a mixture of the metallocenyl silanes of Formula 4 and halo silanes of the formula, (5)
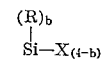

where R, $b$ and X are as defined above.

Some of the metallocenyl silanes of Formula 4 and methods for preparing them are more particularly shown in copending application Ser. No. 283,525, filed May 27, 1963, and assigned to the same assignee as the present invention. Some of these metallocenyl silanes can be made for example, by acylating a metallocene having the formula, (6)        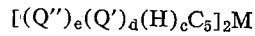

with a silyl acid halide, (7)        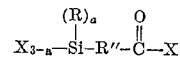

where M, R, R", X and $a$ are as defined above, and Q' is an electron donating radical, Q" is an electron withdrawing radical, $c$ is an integer equal to from 1 to 5, inclusive, $d$ is a whole number equal to from 0 to 4, inclusive, and $e$ is a whole number equal to from 0 to 1, inclusive, while the sum of $c$, $d$ and $e$ is equal to 5. A method for preparing some of the silylorganocarboxylic acid halides of Formula 7 is shown by Sommer et al., J. Am. Chem. Soc., 73, 5130 (1951), which involves the alkylation of a malonic ester with a haloalkyltrialkylsilane, followed by halogenating the resulting acid. Another method is shown by Petrov et al., D. Akad. Nauk, USSR 100, 711 (1955), who utilize beta-cyanoalkyltrihalosilane which is initially alkylated and then hydrolyzed.

Other methods that can be employed to make some of the metallocenylsilanes of Formula 4 such as in the form of silylmethylenemetallocenes are shown in copending application Ser. No. 283,526, filed May 27, 1963, and assigned to the same assignee as the present invention. In addition, there are also shown in copending application Ser. No. 283,526, filed May 27, 1963, methods for making the corresponding silylethylenemetallocenes, and methods for modifying the carbonyl group of the metallocenylsilanes resulting from the acylation of a metallocene such as shown by Formula 6 with the silyl acid halide of Formula 7.

Included by the metallocenyl silanes of Formula 4 are trichlorosilylpropionylferroncene, dimethylchlorosilylbutyrylosmocene, phenyldichlorosilylbenzylruthenocene, dimethylchlorosilylmethyleneferrocene, trichlorosilyleneferrocene, trichlrosilylethyleneferrocene, etc. Organohalosilanes shown by Formula 5 are well known and are shown in Rochow, Chemistry of the Silicones, 2nd edition, John Wiley & Sons (1951). Some of these organohalosilanes are for example, methyltrichlorosilane, dimethyldichlorosilane, methylphenyldichlorosilane, trimethylchlorosilane, etc.

The organopolysiloxane of the present invention can be further shown by the formula, (8) 

where R and Z are as defined above, $f$ has a value from 0 to 2.5, $g$ has a value from 0.001 to 1, and the sum of $f$ and $g$ is equal to 3. The organopolysiloxanes of the present invention further include disiloxanes having the formula, (9) 

where R, R' and Z are as defined above.

The organopolysiloxanes of the present invention composed of units shown by Formula 1, or Formulae 1 and 2, can be in the form of fluids, viscous liquids, gums, rubbery solids, or hard resins, depending upon composition and molecular weight. Preferably, the organopolysiloxanes of the invention have radicals produced from ferrocene, osmocene, or ruthenocene, where M in Formula 3 is iron, osmium, or ruthenium, respectively. The organopolysiloxanes of the present invention can be employed in a variety of applications such as U.V. absorbers, heatage additives for organopolysiloxane compositions, antioxidants, etc.

In the practice of the invention, a metallocenyl silane, such as shown in Formula 4, is hydrolyzed or cohydrolyzed with a halosilane to form an organopolysiloxane. Hydrolysis or cohydrolysis of the metallocenyl silane can be achieved in accordance with standard procedures and conditions using conventional hydrolysis procedures for organohalosilanes. Agitation of the hydrolysis mixture along with the employment of an organic solvent to facilitate the production of the organopolysiloxane can also be utilized. Suitable organic solvents that can be employed for example, are methylene chloride, benzene, toluene, etc. Temperatures that can be utilized are for example, from 0° C. to 100° C.

Some of the organopolysiloxanes of the present invention, such as the disiloxanes shown in Formula 9, can be obtained by direct dealkylation of the metallocenyl silane of Formula 4, such as a demethylation, when direct hydrolysis of the metallocenyl silane is not feasible. Dealkylation can be achieved by employing concentrated sulphuric acid. Clevage of the silicon-carbon bond of the metallocenyl silane converts it to the hydrolyzable sulfato form.

In order that those skilled in the art will be better able to practice the present invention, the following examples are given by way of illustration and not by way of limitation. All parts are by weight.

*Example 1*

Beta-trimethylsilylpropionylferrocene was made by adding at about 25° C., with stirring, to 4.52 parts of ferrocene in methylene chloride, 4 parts of beta-trimethylsilylpropionylchloride dissolved in an equal amount of methylene chloride. To the resulting mixture there were added in small increments over an 80 minute period, 3.4 parts of aluminum chloride, at a rate of about 0.2 part every 5 minutes. The product was then hydrolyzed with 50 parts of ice-cold water and about 7 parts of concentrated hydrochloric acid. The product was then recovered from the methylene chloride layer by conventional washing and stripping procedures, followed by fractionating it by chromatography.

There were added to 0.5 part of the above prepared beta-trimethylsilylpropionylferrocene, about 18 parts of concentrated sulphuric acid. The mixture was agitated for 30 minutes during which time methane was constantly evolved. The mixture was then hydrolyzed by adding it to 35 parts of ice-cold water, and allowing it to stand for 20 hours. The product was then extracted with an equal parts mixture of ether-methylene chloride, and dried over alumina. The solvent was stripped and the product was purified by chromatography using a column prepared with neutral alumina and n-hexane. Elution with an equal parts mixture of hexane-ether gave a 76% yield of a deep orange product having a M.P. of 136–137° C. Its infrared spectrum showed disiloxane, and Si—C bonds superimposed on ferrocene. Based on method of preparation and its infrared spectrum, the product was 1,3-bis(beta-ferrocenoylethyl)tetramethyldisiloxane having the formula,

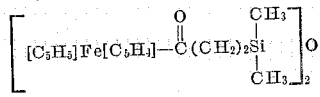

*Example 2*

A mixture of 9.04 parts of ferrocene and 9.96 parts of beta-dichloromethylsilylpropionylchloride was added to 133 parts of dry methylene chloride with stirring. The addition lasted for about 10 minutes and the stirring was continued until the components were completely dissolved. To the resulting solution there were gradually added 6.8 parts of aluminum chloride powder over a period of about 90 minutes. The mixture was stirred for a period of 24 hours and then 2.4 parts of additional aluminum chloride were gradually added with stirring until the hydrogen chloride evolution had stopped. The mixture was added to 150 parts of cold water mixed with 20 parts of concentrated HCl. Two hundred parts of methylene chloride were also added to the mixture which was then allowed to stand several days. The solvent layer was then separated and washed with water and followed by washing with a 5% potassium hydroxide solution. The solvent layer was then stripped and the residue was taken up in ether-methylene chloride and chromatographed on a neutral 80 mesh alumina n-hexane column. There was obtained 2.23 parts of a waxy solid that could be drawn into filaments. Product recovery represented about a 31% yield, based on the weight of the acid chloride. Its infrared spectrum and method of preparation show that the product was a silanal chain-stopped polymethyl-(beta-ferrocenoylethyl)siloxane composed of chemically combined units of the formula,

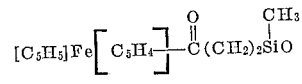

*Example 3*

The procedure of Example 2 was repeated except that before the mixture was hydrolyzed in water and concentrated hydrochloric acid, 54.3 parts of dimethydichlorosilane were added to the mixture. The mixture was then stirred for about 15 minutes and then added to a mixture of cold water and hydrochloric acid as in Example 1. There were recovered about 6.2 parts of a viscous orange product following the same separation procedure as in Example 2, which represented a yield of about 27% of product. The product was then examined by infrared. Its infrared spectrum showed the presence of siloxane and Si—C bonds superimposed upon those of ferrocene. Based on its infrared spectrum and method of preparation, the product was a silanal chain-stopped copolymer composed of the following chemically combined unit,

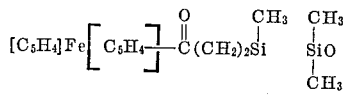

*Example 4*

There is added to a polydimethylsiloxane having a viscosity of about 1 million centipoises at 25° C., while it is milled on a rubber mill, about 0.1 part of the disiloxane of Example 1, per 100 parts of the polydimethylsiloxane polymer. There were also added about 40 parts of fume silica and about 2 parts of benzoyl peroxide. The mixture is then formed into a sheet from which slabs are cut. Slabs are also made following the same procedure except that there is no disiloxane added. The respective slabs are then cured at 150° C. for 10 minutes and then heat-aged for 24 hours at 315° C. It is found that the slabs containing the disiloxane of Example 1 exhibits a much higher degree of heat-age resistance than the slabs made which are free of the disiloxane.

*Example 5*

Beta-trimethylsilylpropionylosmocene is made by adding to a solution of osmocene in methylene chloride, an equimolar amount of beta-trimethylsilylpropionylchloride dissilved in methylene chloride, while the mixture is stirred. To the mixture, there are also added gradually small increments of aluminum chloride until a stoichiometric amount of aluminum chloride is added. This product is then hydrolyzed with a mixture of ice-cold water and concentrated hydrochloric acid. The methylene chloride layer is then worked up, and the product recovered as shown by Example 1.

Following the procedure of Example 1, concentrated sulphuric acid is added to the beta-trimethylsilylpropionylosmocene in proportions of from about 2 moles of sulphuric acid per mole of the silyl-substituted-osmocene. The mixture is agitated for about 30 minutes until all the methane is evolved. The mixture is then hydrolyzed in ice-cold water and allowed to stand for about 20 hours. The product is then extracted with an equal part mixture of ether-methylene chloride, and dried over alumina. The product is then purified after stripping off the solvent by chromatography. Based on its method of preparation, and infrared spectrum, the product is 1,3-bis(beta-osmocenoylethyl)tetramethyldisiloxane having the formula,

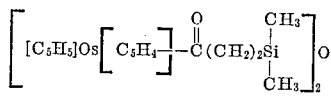

*Example 6*

An equimolar mixture or ruthenocene and gamma-dichloromethylsilylbutyrylchloride is added to dry methylene chloride with stirring. The mixture is stirred until the components are completely dissolved. There is gradually added to the solution, a stoichiometric amount of aluminum chloride over a period of about 90 minutes. The mixture is stirred for a period of about 24 hours until the hydrogen chloride evolution has stopped. There is then added to the mixture, a cold 10% hydrochloric acid solution to provide for the production of a hydrolysis mixture having about 30 moles of water per mole of acylated ruthenocene. To the hydrolysis mixture there is added methylene chloride and it is allowed to stand several days. The solvent layer is separated and treated with a 5% potassium hydroxide solution. The solvent layer is then stripped and the residue is extracted with an ether-methylene chloride solution and purified by chromatography as in Example 2. The product is then examined by infrared. Its infrared spectrum shows the presence of siloxane superimposed on ruthenocene. Based on method of preparation and its infrared spectrum the product is a silanol chain-stopped polymethyl(gamma-rutheneconoylpropyl)siloxane composed of chemically combined units of the formula,

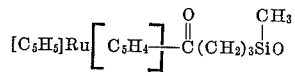

*Example 7*

The procedure of Example 1 is repeated, except that gamma-trimethylsilylpropylferrocene is utilized. The beta-trimethylsilylpropionylferrocene is reduced by adding it to a mixture of a mercury-zinc amalgam, in a strong hydrochloric acid solution. The mixture of the trimethylsilylpropionylferrocene in n-hexane, and the amalgam is refluxed for 19 hours. The gamma-trimethylsilylpropylferrocene is recovered by chromatography.

There are added to 0.5 part of the above prepared gamma-trimethylsilylpropylferrocene, about 18 parts of concentrated sulfuric acid. The mixture is agitated for 30 minutes resulting in the formation of methane which is constantly evolved. The mixture is then hydrolyzed by adding it to 35 parts of ice-cold water, neutralizing with base and allowing it to stand for 20 hours. The product is then recovered by chromatography following the procedure of Example 1. Its infrared spectrum shows the absence of carbonyl, and the presence of Si—C and Si—O—Si bonds superimposed on ferrocene. Based on its method of preparation and its infrared spectrum, the product is 1,3-bis(gamma-ferrocenylpropyl)tetramethyldisiloxane having the formula,

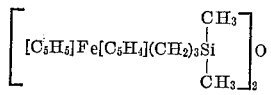

While the foregoing examples have of necessity been limited to only a few of the many variables with respect to the process and product within the scope of the present invention, it should be understood that the present invention covers a much broader class of organopolysiloxane polymers and copolymers composed of chemically combined units of Formulae 1 and 2 and methods for making them. These organopolysiloxanes have radicals shown by Formula 3 which can be composed of any-one of a variety of transistion metals previously described chemically componed with cyclopentadienyl radicals.

What we claim as new and desire to secure by Letters Patent of the United States is:

1. Organopolysiloxanes selected from the class consisting of,
   (a) polymers composed of chemically combined structural units of the formula,

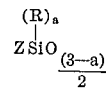

and
   (b) copolymers composed of chemically combined structural units of the formula,

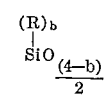

and at least one unit of (a), where R is a member selected from the class consisting of monovalent hydrocarbon radicals, halogenated monovalent hydrocarbon radicals, cyanoalkyl radicals, and fluoroalkyl radicals, Z is an organometallocene radical having the formula,

R' is a member selected from the class consisting of an arylene radical, alkylene radical, and —R''—Y—, R'' is an alkylene radical of at least two carbon atoms, Y is carbonyl, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxyaliphatic radicals, triorganosilyl radicals, and nitroaliphatic radicals, a monovalent electron withdrawing organic radical selected from the class consisting of aliphaticacyl radicals, arylacyl radicals, carboxyaryl radicals, nitroaryl radicals, haloaryl radicals, and haloaliphatic radicals, and mixtures thereof, M is a transition metal bonded to two cyclopentadienyl radicals and selected from the class consisting of titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium, and platinum, $a$ is a whole number equal to from 0 to 2, inclusive, and $b$ is a whole number equal to from 0 to 3, inclusive.

2. Organopolysiloxanes composed of chemically combined structural units having the formula,

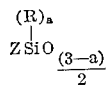

where R is a member selected from the class consisting of monovalent hydrocarbon radicals, halogenated monovalent hydrocarbon radicals, cyanoalkyl radicals, and fluoroalkyl radicals, Z is an organometallocene radical having the formula,

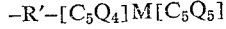

R' is a member selected from the class consisting of an arylene radical, alkylene radical, and —R''—Y—, R'' is an alkylene radical of at least two carbon atoms, Y is carbonyl, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxyaliphatic radicals, triorganosilyl radicals, and nitroaliphatic radicals, a monovalent electron withdrawing organic radical selected from the class consisting of aliphaticacyl radicals, arylacyl radicals, carboxyaryl radicals, nitroaryl radicals, haloaryl radicals, and haloaliphatic radicals, and mixtures thereof, M is a transition metal bonded to two cyclopentadienyl radicals and selected from the class consisting of titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium, and platinum, and $a$ is a whole number equal to from 0 to 2 inclusive.

3. A polymer in accordance with claim 1, where M is iron.

4. Organopolysiloxanes composed of chemically combined structural units of the formula,

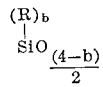

and at least one unit of the formula,

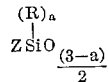

where R is a member selected from the class consisting of monovalent hydrocarbon radicals, halogenated monovalent hydrocarbon radicals, cyanoalkyl radicals, and fluoroalkyl radicals, Z is an organometallocene radical having the formula

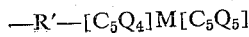

R' is a member selected from the class consisting of an arylene radical, alkylene radical, and —R''—Y—, R'' is an alkylene radical of at least two carbon atoms, Y is carbonyl, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxyaliphtaic radicals, triorganosilyl radicals, and nitroaliphatic radicals, a monovalent electron withdrawing organic radical selected from the class consisting of aliphaticacyl radicals, arylacyl radicals, carboxyaryl radicals, nitroaryl radicals, haloaryl radicals, and haloaliphatic radicals, and mixtures thereof, M is a transition metal bonded to two cyclopentadienyl radicals and selected from the class consisting of titanium, vanadium, chromium, manganese, iron, cobalt, nickel, zirconium, columbium, molybdenum, technetium, ruthenium, rhodium, palladium, hafnium, tantalum, tungsten, rhenium, osmium, iridium, and platinum, $b$ is a whole number equal to from 0 to 3, inclusive, and $a$ is a whole number equal to from 0 to 2, inclusive.

5. Disiloxanes having the formula,

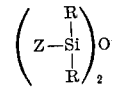

where R is a member selected from the class consisting of monovalent hydrocarbon radicals, halogenated monovalent hydrocarbon radicals, cyanoalkyl radicals, and fluoroalkyl radicals, Z is an organometallocene radical having the formula,

R' is a member selected from the class consisting of an arylene radical, alkylene radical, and R''—Y—, R'' is an alkylene radical of at least two carbon atoms, Y is carbonyl, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxyaliphatic radicals, triorganosilyl radicals, and nitroaliphatic radicals, a monovalent electron withdrawing organic radical selected from the class consisting of aliphaticacyl radicals, arylacyl radicals, carboxyaryl radicals, nitroaryl radicals, haloaryl radicals, and haloaliphatic radicals, and mixtures thereof, and M is a transition metal bonded to two cyclopentadienyl radicals and selected from the class consisitng of titanium, vanadium, chromium, manganese, iron, cobalt, nickel, zirconium, columbium, molybdenum, technetium, ruthenium, rhodium, palladium, hafnium tantalum, tungsten, rhenium, osmium, iridium, and platinum.

6. 1,3-bis(beta-ferrocenoylethyl)tetramethyldisiloxane.

7. 1,3-bis(beta-osmocenoylethyl)tetramethyldisiloxane.

8. Organopolysiloxanes having the formula,

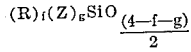

where R is a member selected from the class consisting of monovalent hydrocarbon radicals, halogenated monovalent hydrocarbon radicals, cyanoalkyl radicals, and fluoroalkyl radicals, Z is a organometallocene radical having the formula,

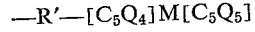

R' is a member selected from the class consisting of an arylene radical, alkylene radical, and R''—Y—, R'' is an alkylene radical of at least two carbon atoms, Y is carbonyl, Q is chemically bonded to a cyclopentadienyl radical and is a member selected from the class consisting of hydrogen, a monovalent electron donating organic radical selected from the class consisting of aryl radicals, hydroxyaryl radicals, aliphatic radicals, cycloaliphatic radicals, carboxyaliphatic radicals, triorganosilyl radicals, and nitroaliphatic radicals, a monovalent electron withdrawing organic radical selected from the class consisting of aliphaticacyl radicals, arylacyl radicals, carboxyaryl radicals, nitroaryl radicals, haloaryl radicals, and haloaliphatic radicals, and mixtures thereof. M is a transition metal bonded to two cyclopentadienyl radicals and selected from the class consisting of titanium, vanadium, chromium, manganese, iron, cobalt, nickel, zirconum, columbium, molybdenum, technetium, ruthenium, rhodium, palladium, hafnium, tantalum, tungsten, rhenium, osmium, iridium, and platinum, $f$ has a value of from 0 to 2.5, inclusive, $g$ has a value of from 0.001 to 1, and the sum of $f$ and $g$ is equal to from 1 to 3, inclusive.

No references cited.

HELEN M. McCARTHY, *Primary Examiner.*

J. G. LEVITT, P. F. SHAVER, *Assistant Examiners.*